US012172538B2

(12) United States Patent
Curran et al.

(10) Patent No.: US 12,172,538 B2
(45) Date of Patent: Dec. 24, 2024

(54) INDUCTIVE POWER TRANSFER DEVICE AND SYSTEM FOR INDUCTIVELY CHARGING A WATER-BOUND VEHICLE AND METHOD FOR OPERATING AN INDUCTIVE POWER TRANSFER DEVICE

(71) Applicant: Bombardier Primove GmbH, Berlin (DE)

(72) Inventors: Éanna Curran, Darmstadt (DE); Sergio Alejandro Perez Romero, Alsbach-Hähnlein (DE)

(73) Assignee: ENRX IPT GmbH, Efringen-Kirchen (DE)

( * ) Notice: Subject to any disclaimer, the term of this patent is extended or adjusted under 35 U.S.C. 154(b) by 534 days.

(21) Appl. No.: 17/296,468

(22) PCT Filed: Dec. 3, 2019

(86) PCT No.: PCT/EP2019/083540
§ 371 (c)(1),
(2) Date: May 24, 2021

(87) PCT Pub. No.: WO2020/115069
PCT Pub. Date: Jun. 11, 2020

(65) Prior Publication Data
US 2021/0394633 A1 Dec. 23, 2021

(30) Foreign Application Priority Data
Dec. 3, 2018 (GB) .................................. 1819707

(51) Int. Cl.
*B60L 53/38* (2019.01)
*B60L 53/12* (2019.01)
*B63H 21/16* (2006.01)
*H02J 50/10* (2016.01)

(52) U.S. Cl.
CPC ............... *B60L 53/38* (2019.02); *B60L 53/12* (2019.02); *B63H 21/16* (2013.01); *H02J 50/10* (2016.02);
(Continued)

(58) Field of Classification Search
CPC ....................................................... B60L 53/38
(Continued)

(56) References Cited

U.S. PATENT DOCUMENTS 10,059,419 B2 * 8/2018 Glueckhardt ........... B60L 53/00
10,230,243 B2 * 3/2019 Schatz ..................... H03H 7/40

FOREIGN PATENT DOCUMENTS

FR 2781755 A1 2/2000
GB 2508923 A 6/2014
(Continued)

OTHER PUBLICATIONS

Search Report dated May 21, 2019 in connection with GB1819707.9. filed Dec. 3, 2018.
(Continued)

*Primary Examiner* — Yalkew Fantu
(74) *Attorney, Agent, or Firm* — Downs Rachlin Martin PLLC

(57) ABSTRACT

The invention relates to an inductive power transfer device for an inductive power transfer to a water-bound vehicle, with a power transfer part, comprising a primary conductor arrangement; and a kinematic unit for enabling a movement of the power transfer part; wherein the kinematic unit comprises a linear guide which is oriented so that, when the power transfer part is displaced along a path defined by the linear guide, a position of the power transfer part along a vertical spatial axis (Z) is altered. Further, the invention
(Continued)

Figure 1:
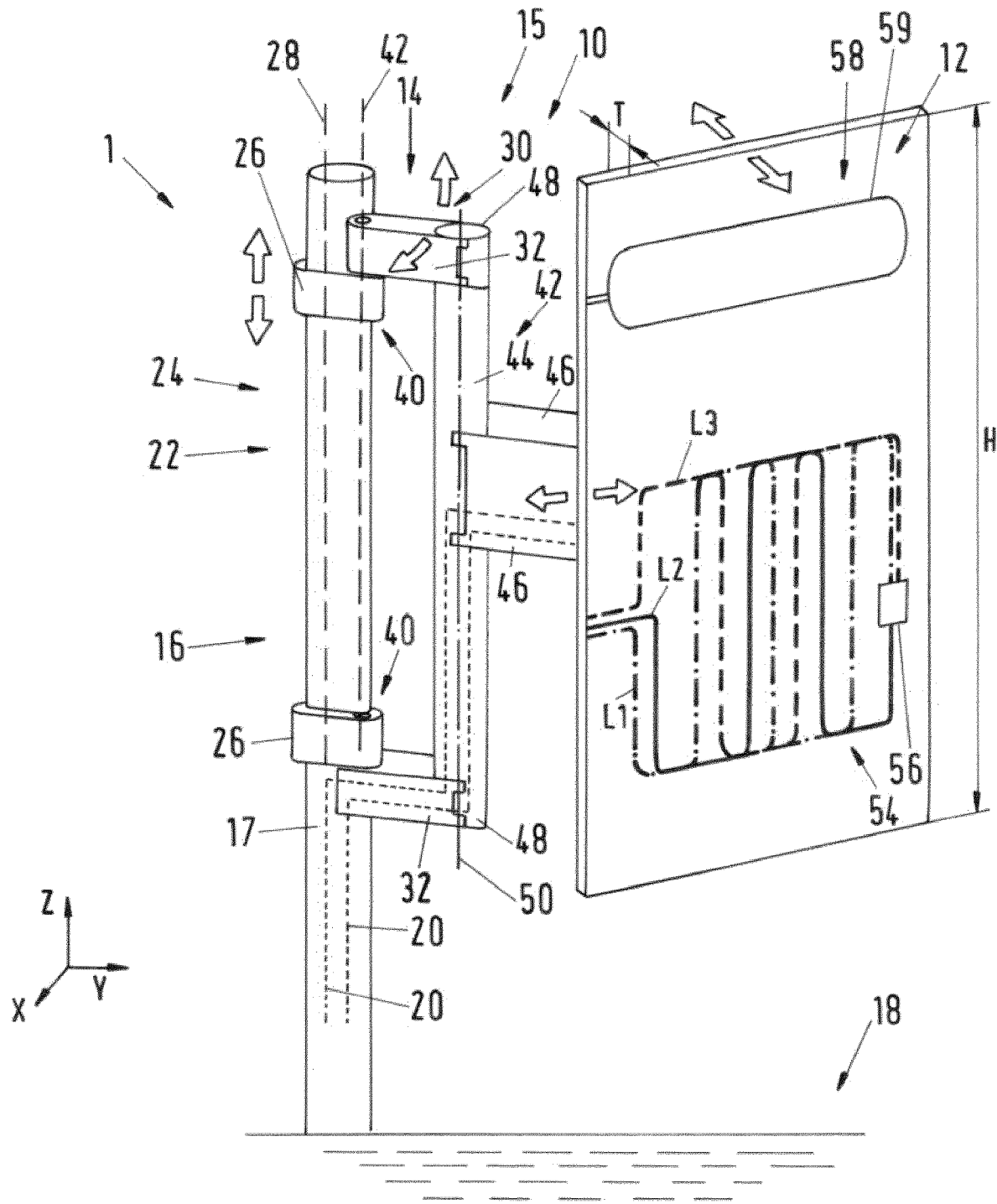

relates to a system for an inductive power transfer to a water-bound vehicle and a method for operating an inductive power transfer device.

11 Claims, 3 Drawing Sheets

(52) U.S. Cl.
CPC ....... *B60L 2200/32* (2013.01); *H02J 2310/42* (2020.01)

(58) Field of Classification Search
USPC .......................................................... 320/108
See application file for complete search history.

(56) References Cited

FOREIGN PATENT DOCUMENTS

| | | | |
|---|---|---|---|
| GB | 2512864 A | | 10/2014 |
| GB | 2517679 A | | 3/2015 |
| JP | 200092615 A | | 3/2000 |
| JP | 2010011696 | * | 1/2010 |
| JP | 2010011696 A | | 1/2010 |
| JP | 2011193616 A | | 5/2014 |
| JP | WO2016/140239 | * | 9/2016 |
| KR | 10-2011-0035357 | | 4/2011 |
| KR | 101596923 A | | 2/2016 |
| WO | 2016140239 A1 | | 9/2016 |
| WO | 2017125153 A1 | | 7/2017 |
| WO | WO-2017125153 | * | 7/2017 |
| WO | 2017209735 A | | 12/2017 |

OTHER PUBLICATIONS

International Search Report and Written Opinion dated Feb. 25, 2020, in connection with PCT/EP2019/083540 filed Dec. 3, 2019.

* cited by examiner

INDUCTIVE POWER TRANSFER DEVICE AND SYSTEM FOR INDUCTIVELY CHARGING A WATER-BOUND VEHICLE AND METHOD FOR OPERATING AN INDUCTIVE POWER TRANSFER DEVICE

The invention relates to an inductive power transfer device and a system for an inductive power transfer to a water-bound vehicle as well as a method for operating such a power transfer device. Preferably, the vehicle is electrically propelled or, in other words, electrically driven and the inductive charging is used for providing electric energy that is usable for electrically propelling said vehicle. The transferred electric energy may (additionally or alternatively) also be used for different purposes other than propulsion, such as for operating onboard electrical systems of the vehicle.

Electric vehicles, in particular water-bound vehicles such as boats, ships, or marine vessels, can be propelled by electric energy which is generally transferrable by means of an inductive power transfer. The vehicle may comprise a circuit arrangement which can be a propulsion system or a part of a propulsion system of the vehicle, comprising a receiving device adapted to receive an alternating electromagnetic field and to produce an alternating electric current by electromagnetic induction. Furthermore, such a vehicle can comprise a rectifier adapted to convert an alternating current (AC) to a direct current (DC). The DC can be used to charge a battery or to operate an electric machine. In the latter case, the DC can be converted into an AC by means of an inverter.

Typically, the inductive power transfer is performed by using sets of e.g. three-phase primary conductor arrangements which may each be formed into windings or generally into specific shapes, courses or paths of electric conductors. A first set is installed in the surroundings (primary conductor arrangement) and may be fed by a so-called wayside power converter (WPC). The primary conductor arrangements and/or the wayside power converter may be part of a so-called primary unit which typically remains in a stationary position (but may comprise movable parts). The second set (i.e. secondary conductor arrangement) may be installed on the vehicle. The second primary conductor arrangement or, generally, the secondary side is often referred to as a pick-up-arrangement or receiver. The first primary conductor arrangement and the second primary conductor arrangement form a high frequency transformer to transfer electric energy to the vehicle. This can be done in a static state when there is no movement of the vehicle by way of its propulsion system or in a dynamic (i.e. moving) state.

There exist a number of solutions for the inductive electric charging of road- or track-bound vehicles with help of respective primary conductor arrangements. In these cases, it is reasonable to assume that the relative position of a vehicle (e.g. a specific car, train or truck model) and the power transfer device will stay within certain predefined limits. This relates in particular to a relative position along a vertical spatial axis, said axis extending along a direction of the gravitational force and being oriented oppositely thereto. Along this axis, the relative position will be substantially constant and defined by the non-movable road or track surface.

For water-bound vehicles (e.g. ships or boats), this assumption only holds under specific circumstances. For example, this would require a water level on which the vehicle floats to remain substantially constant. This is not fulfilled for bodies of water which are subjected to tidal changes of the water level. In these cases, solutions for the inductive charging of road or track-bound vehicles may turn out to be inefficient or even non-usable.

WO 2017/125153 A1 discloses an inductive charging device for marine applications having a power transfer device that is movable relative to a ship by means of a diagonally extending retractable working arm as well as by means of hydraulic or pneumatic cylinders. A height of the power transfer device (e.g. for responding to different water levels) has to be jointly adjusted by changing a length of the retractable arm and by activating the additional hydraulic or pneumatic cylinders. The number of movable parts and actuators is thus relatively high. Overall, the resulting structure is rather complex, difficult to operate and space-inefficient. Also, due to the complexity and size, a desired reliability may be difficult to achieve and the costs will be high.

It is an object of the invention to provide an inductive power transfer device and a method for operating the same which allow for an inductive power transfer to water-bound vehicles, in particular with regard to changing water levels, while maintaining a reliable as-well-as cost- and space-efficient structure.

This object is solved by a device and a method according to the attached independent claims. Advantageous embodiments are defined in the dependent claims. Moreover, the features mentioned in the introductory part of the description may individually or in any combination thereof also be provided in the presently disclosed solution, if not mentioned or evident otherwise.

The invention generally suggests a design of an inductive power transfer device which allows for a reliable adjustment to changing water levels while having a limited size. Specifically, for altering a vertical spatial position (or height) of a power transfer part comprising the primary conductor arrangement, a linear guide is provided along which the power transfer part is movable. The linear guide (or, differently put, rectilinear guide) may, for example, be oriented along a vertical spatial axis or generally at an angle to the horizontal spatial plane. Moreover, the orientation (and/or position) of the linear guide may be fixed. Thus, the linear guide may be directly oriented so as to provide the necessary movements (i.e. vertical height adjustments) while maintaining a compact size. Further, a vertical height adjustment and additionally required movements, such as movements to and away from a vehicle, may at least partially be decoupled and/or provided by individual kinematic members (i.e. individual joints or guides). This allows for an and least partial function separation with regard to the required movements, thereby simplifying the overall structure.

The suggested power transfer device can be realized as a compact and simple structure. It may thus be easy to install, e.g. without a need for spacious and complex foundations. It may be easy to retrofit to existing mooring areas such as quays or jetties. The power transfer device may generally be designed as a largely or fully passive system, i.e. not comprise any or only a limited number (e.g. one) actuator for producing the desired movements. This further limits complexity and costs and also the need for working (e.g. hydraulic) or lubricating fluids, thus limiting the risk of pollution due to spills.

In WO 2017/125153 A1, to the contrary, a large range of possible angles of the retractable arm with respect to a horizontal plane may occur in response to changing water levels. Accordingly, forces will be transferred via said arm into the remaining structure under a respectively large range of possible angles. In consequence, there also exists a wide range of possible force distributions within the structure, thus requiring a large, complex and particularly strong design in order to cope therewith. Moreover, for changing a height of the power transfer part comprising a primary conductor arrangement, the retractable arm of WO 2017/125153 A1 as well as the pneumatic or hydraulic cylinders attached thereto need to be operated in a coordinated manner. The resulting structure is thus difficult to operate.

In more detail, an inductive power transfer device for an inductive power transfer to a water-bound vehicle is suggested, with:
a power transfer part, comprising a primary conductor arrangement; and
a kinematic unit for enabling a movement of the power transfer part (e.g. with respect to a water surface and/or a vehicle to which power is to be transferred to);
wherein the kinematic unit comprises a linear guide which is oriented so that, when the power transfer part is displaced along a path defined by the linear guide, a position of the power transfer part along a vertical spatial axis is altered.

The vehicle, which may e.g. be a ship, boat or marine vessel, may be water-bound at least during the inductive power transfer. The transferred electrical energy may be usable for an electric propulsion system of the vehicle which may e.g. comprise a rotatable propeller or a pump-jet. Additionally or alternatively, the energy may be usable for onboard electric systems of the vehicle, other than a propulsion system.

The inductive power transfer device may generally be part of a primary unit of a system for inductive power transfer. It may generally be stationary but comprise movable members e.g. such as the kinematic unit. Note that the term member as used herein relates to both multi-part and single-part members, i.e. also covers assemblies of a plurality of parts which form a respective member.

The power transfer part may be configured as or comprise a plate-type member or a panel. The power transfer part may, especially when configured as a plate-type member or panel, define a plane which may coincide with or extend in parallel to the plane in which the primary conductor arrangement is formed. The primary conductor arrangement may be configured to generate an alternating (electro-)magnetic field if the primary conductor arrangement is energised or supplied with an operating current, said field enabling the inductive power transfer to the vehicle.

The power transfer part may comprise a housing (e.g. formed by the optional plate-type member or panel thereof). The primary conductor arrangement may be received in and/or be surrounded by said housing. Further, the inductive power transfer device may comprise at least one connecting terminal for a power connection of the primary conductor arrangement or other electrical elements such as a converter, said connecting terminal being e.g. formed at the power transfer part.

Further, the primary conductor arrangement may comprise a plurality of phase lines, for example three phase lines. These can generally be configured to generate the aforementioned electromagnetic field for the inductive power transfer, e.g. when being fed within alternating current. At least one phase line of the primary conductor arrangement can have a meandering course. Alternatively, at least one phase line of the primary conductor arrangement can be designed such that a course of the phase line provides an even number or uneven number of sub-windings which are arranged adjacent to each other. In this context, a sub-winding denotes a, preferably complete, conductor loop, which encloses a predetermined area. The conductor loop can provide or comprise one turn or multiple turns of a respective sub-winding. Adjacent to each other means that central axes of said sub-windings, in particular the axes of symmetry, are spaced apart from one another, e.g. with a predetermined distance, along a common straight line which can e.g. correspond to a direction of extension of the primary conductor arrangement. Further, the course of at least one phase line of the primary conductor arrangement can be 8-shaped. This means that the phase line comprises two, e.g. circular-shaped, sub-windings which are arranged adjacent to each other. Examples for forming a primary conductor arrangement out of respective phase lines can be found in GB 2512864 A. In the context of this invention, the primary conductor arrangement may be formed according to any of the examples disclosed in GB 2512864 A and any of the elements disclosed in GB 2512864 A as interacting with the primary conductor arrangement may also be compromised by the inductive power transfer device disclosed herein.

In one example, at least one or preferably all of the phase lines are held in position by means of a cable bearing element, said cable bearing element being preferably formed as a plastic mould.

Moreover, the inductive power transfer device, in particular the power transfer part, may comprise at least one guiding means for guiding a magnetic flux. In particular, the power transfer device can comprise a ferrite arrangement, wherein the ferrite arrangement can e.g. comprise one or more ferrite elements, such as ferrite bars, strips or slabs. The guiding means can be used to guide a magnetic flux of the generated electromagnetic field along a desired path.

The guiding means may be formed by or comprise a magnetic layer within the inductive power transfer device and in particular the power transfer part, said layer e.g. comprising the ferrite bars of ferrite strips. The magnetic layer may further comprise a rigid plate, preferably formed of a non-magnetic metallic material such as aluminium, at which the ferrite elements are arranged. The magnetic layer may provide a stabilising function for the power transfer part and e.g. be designed with a thickness of several millimetres or even several centimetres.

The inductive power transfer device may comprise cables which can e.g. be guided towards and connected to the power transfer part. The cables may have a variable straight length (e.g. by being selectively wound onto or off a cable roller or drum).

Additionally or alternatively, the cables may be provided with a defined slack or looseness in order to avoid limitations to the possible movements of the power transfer part. At least a section of the cables may be surrounded by a protective sleeve or tube, both of which are preferably flexible and/or elastic and/or watertight. These sections of the cables may be guided through and thus shielded by members of the inductive power transfer device, such as hollow members of the kinematic unit. The protective sleeve or tube may also be composed of different layers, where one the layer may be a shielding preferably formed of a non-magnetic metallic material such as aluminium. In case a subsequently discussed holding structure for the kinematic unit, such as a pillar, bollard, post or column is provided, the cables may be guided through and preferably be shielded by at least a portion of said holding structure.

The inductive power transfer device and in particular the power transfer part may comprise at least one object detection means which, at least in certain embodiments, may be referred to as an antenna. The object detection means can denote a system for detecting a foreign object, in particular a metal object, within a charging volume of the power transfer pad. Alternatively or in addition, the object detection means can be denote a system for detecting a moving object within the charging volume. The charging volume can denote a volume through which at least a predetermined portion, e.g. 80%, 90% or 95%, of the electromagnetic field generated by the primary conductor arrangement extends. The charging volume can also denote the volume through which the total electromagnetic field generated by the primary conductor arrangement extends. Also, the charging volume can denote the volume in front of the power transfer part, e.g. in front of the primary conductor arrangement. A charging surface can denote a base surface of the charging volume. In particular, the charging surface can be front surface of the power transfer part.

The at least one object detection means can comprise at least one inductive sensing system, wherein an active or passive detection can be performed by the inductive sensing system. In each case, the inductive sensing system can comprise one or multiple detection winding(s). Multiple detection windings can be arranged in an array structure wherein the array structure covers the charging surface of the power transfer part. In case of an active detection, one or more excitation winding(s) can be used. An active object detection can be performed by monitoring properties of an excitation field generated by the excitation winding(s). In the case of a passive detection, only one or more passive winding(s) are used. A passive object detection can be performed by monitoring properties of the passive winding(s), in particular an inductance. Such an inductive detection system is disclosed in GB 2508923 A or in GB 2517679 A. In the context of this invention, a detection system can be designed according to any of the embodiments as claimed in GB 2508923 A or in GB 2517679 A which are incorporated herein by reference.

As previously noted, the vertical axis may coincide with an axis of the gravitational force and may further from a normal to the horizontal spatial plane (i.e. extend orthogonally thereto), the horizontal spatial plane comprising at least one horizontal spatial axis. The horizontal spatial plane may also comprise or extend in parallel to the water surface, at least in the absence of waves. If not mentioned or evident otherwise, the terms vertical and horizontal relate to an above-mentioned vertical and horizontal axis, respectively.

The conductors (e.g. in form of phase lines) of the primary conductor arrangement may be formed in the same, adjacent or parallel spatial planes (e.g. when being stacked on top of one another), each of said plane being preferably non-horizontal. A plane in which the conductor arrangement extends may comprise one of these spatial planes or be defined as a median plane extending between at least two of said planes.

In general, a direction of the magnetic flux generated by the primary conductor arrangement may extend at an angle (e.g. substantially orthogonally) to the power transfer part and in particular a panel or plate-type member thereof. In one example, the direction of the magnetic flux extends substantially horizontally. Also, the direction of the magnetic flux may extend substantially orthogonally to the plane of the conductor arrangement. The direction of the magnetic flux may relate to the part of the magnetic field extending within the plane of and/or being at least partially enclosed by the primary conductor arrangement (i.e. the part which extends orthogonally through the loops or the meandering sections of the primary conductor arrangement).

The primary conductor arrangement may extend in a non-horizontal spatial plane. Differently put, the loops or meandering sections of said conductor arrangement may be formed in at least one non-horizontal plane.

In general, the primary conductor arrangement and/or its single loops or meandering sections may extend substantially in parallel to a plane of the power transfer part, e.g. substantially in parallel to a front surface of the power transfer part. Said front surface may be arranged so as to face the vehicle to which the electric power is to be inductively transferred to. Differently put, a plane of the primary conductor arrangement and/or of its single loops or windings (i.e., a plane in which at least one of its loops or windings is formed), may be arranged so as to face the vehicle to which the electric power is to be inductively transferred to.

The kinematic unit may generally comprise at least one linear joint or axis (e.g. in form of the linear guide) and/or at least one rotational joint or axis (e.g. in form of a rotational joint connecting adjacent arm segments in a rotatable manner). The kinematic unit may allow for adjusting a position and/or orientation of the power transfer part, in particular with respect to the surroundings and/or the vehicle. By way of the kinematic unit, the power transfer part may be moved along at least two and preferably three spatial axes of a Cartesian spatial coordinate system. Additionally, the kinematic unit may allow for a rotational movement of the power transfer part about at least of one and preferably two or three of said spatial axes. It thus to be understood that the kinematic unit enables a movement by way of its joints and/or axes (i.e. by providing certain degrees of freedom or, differently put, displaceably connecting the power transfer part to e.g. a holding structure). Yet, the kinematic unit may only as an option also include actuators for actually carrying out movements about at least one of axes or joints of the kinematic unit (e.g. an actuator that is operable to achieve a height adjustment). Also, the linear guide may be the only means the kinematic unit to set a height of the power transfer part along a vertical spatial axis.

The kinematic unit may comprise a first portion which is fixable to the surroundings, such as a wall, bollard or column. Additionally or alternatively, the kinematic unit may comprise a second portion to which the power transfer part is attachable, the first and second portion being preferably arranged at opposite regions of the kinematic unit. Overall, the kinematic unit may generally be positionable or positioned between the power transfer part and the surroundings or surrounding structure to which the inductive power transfer device is to be attached.

In one example, the kinematic unit is configured to be attached to a holding structure, said structure comprising e.g. at least a portion of at least one pillar, post, bollard or column. The inductive power transfer device may comprise the respective holding structure. The holding structure is preferably stationary and may e.g. be anchored or otherwise held in place at or within the water. In general, the holding structure may comprise an upright member extending above the water level and the kinematic unit is preferably fixed to a portion of the holding structure in a position above the water level.

According to one embodiment of the device and method, the linear guide is at least partially formed by the holding structure. For example, the linear guide may comprise a guiding member and a displaceable member such as a sleeve which is displaceable along said guiding member. The guiding member may be formed by a portion of the holding structure, e.g. as a section of a respective column, post or pillar. In summary, the holding structure may be configured as a separate member from the kinematic unit. Yet, at least a portion thereof acting as a guiding member may form part of the kinematic unit.

Generally, the linear guide may comprise a guiding member and a displaceable member which is linearly displaceable relative to the (preferably stationary) guiding member. Note that the term linear as used herein refers to a linear (i.e. line-shaped or one-dimensional) feature having a preferably straight or alternatively a curved or bent course along a defined line. The displaceable member may be supported by the guiding member at each position along a linear (displacement) path defined by the guiding member and preferably be supported fully (e.g. along its whole length) and/or to a similar degree at each position. Generally, the displaceable manner may be received in a groove or rail defined by the guiding member and/or be supported by said guiding member in a non-cantilevered or non-telescopic manner.

To the displaceable member, further members of the kinematic unit such as the foldable arm discussed below and/or the power transfer part may be directly or indirectly coupled. The displaceable member may generally slide, slip or roll along or within the guiding member. As noted above, the guiding member may be configured as a section of a column, post or pillar. Alternatively, the guiding member may be configured as a rail, elongated profile, groove, track or generally as an elongated member. The path defined by said guiding member may be a linear path and may extend along a longitudinal axis of the guiding member, wherein the longitudinal axis may generally extend along a longest dimension of the guiding member. The orientation of the linear guide and/or a general orientation and the linear path or course of displacement may be defined by the guiding member. The linear path defined by the linear guide is preferably straight (i.e. non-curved and/or free of angles or bends). Generally, the path may extend along the vertical spatial axis.

The displacement of the power transfer part along a linear path may refer to the possibility of changing a position and/or orientation of the transfer part by means of and along at least the guiding member of the linear guide. The forces required to displace the power transfer part, however, may be provided independently of the linear guide as well as the power transfer part, e.g. by means of a separate actuator or by hand. Accordingly, the linear guide may be free of actuators directly acting on the displaceable member (e.g. free of hydraulic or pneumatic actuators). Instead, such actuators may act on the power transfer part or other members of the kinematic unit, thereby indirectly transferring forces for movement onto the displaceable member of the linear guide.

The displacement of the power transfer part may be achieved by directly connecting the power transfer part to the linear guide (e.g. to a displaceable member thereof) or by indirectly coupling the power transfer part to the linear guide (e.g. via further members of the kinematic unit arranged therebetween, such as the foldable arm discussed below). In one example, a movement path of the power transfer part when being moved along the linear guide may coincide with or extend in parallel to said the path defined by said guide (e.g. may be linear as well). Accordingly, said movement path may be substantially straight and/or non-curved and, preferably, extend along the vertical spatial axis.

In one example, the kinematic unit and/or the overall inductive power transfer device is free of any further members allowing for a substantial displacement (e.g. of several centimetres or at least 30 cm) of the power transfer part along the vertical spatial axis. In other words, the linear guide may be the only vertical guide member within the kinematic unit and/or the inductive power transfer device.

As noted above, an orientation of the linear guide, in particular of its guiding member, is chosen so that the power transfer part is displaceable along a vertical spatial axis. This way, a height of the power transfer part relative to a water surface and/or a vehicle to which power is to be transferred to may be altered. By doing so, changes in the water level can be compensated for. Advantageously, this may be achieved by means of moving the power transfer part along the linear guide and without the need to coordinate numerous actuators, such as a plurality of retractable arms and cylinders. Also, due to providing a dedicated kinematic member for the vertical height adjustment in form of the linear guide, said member may be optimised for this specific purpose and the forces occurring in connection with said height adjustment.

According to a further embodiment of the device and method, the kinematic unit may be configured such that the orientation of the linear guide (and/or its path) at least with respect to the horizontal spatial plane is fixable or fixed (i.e. may remain constant). For doing so, the guiding member of the linear guide may be generally stationary and/or fixedly arranged within the inductive power transfer device. Preferably, the position of the linear guide (and/or of its linear path) is fixable or fixed as well. This way, the distribution of forces within the overall device and in particular and orientation of the forces exerted on to the guide rail and/or from there to its neighbouring members may be kept in a more predictive and narrower range. This allows for simplifying the overall design, thereby saving costs and lowering this complexity.

As previously noted, the linear guide comprises an elongated guiding member and a displaceable member which is displaceable along said guiding member, the guiding member preferably being non-retractable. Specifically, the linear guide may be formed as a rigid member with a non-variable length and/or generally non-variable dimensions. This further helps to increase the reliability and to simplify the overall design.

In a further development of the device and method, said linear guide (and/or the linear path defined thereby) extends at an angle of between 70° and 110° with respect to a horizontal spatial plane, and preferably at an angle of between 80° and 100°, of between 85° and 95° or of substantially 90° (i.e. along the vertical spatial axis). Accordingly, by moving the power transfer part along the linear guide, a height thereof (i.e. a position along the vertical spatial axis) may directly be set. This is beneficial in terms of simplifying the operability and structure of the overall device.

According to a further example of the device and method, the kinematic unit further comprises a foldable arm that allows for a movement of the power transfer part along at least one horizontal spatial axis. Accordingly, the foldable arm may be configured to adjust a (horizontal) distance between the power transfer part and a vehicle to which the power is to be transferred to. The foldable arm may comprise at least one joint connecting segments of the arm so that these may be moved away or towards one another, thereby unfolding or folding the arm. The foldable arm may be (preferably directly) coupled to the linear guide (e.g. to a displaceable member thereof). Additionally or alternatively, the foldable arm may be (preferably directly) coupled to the power transfer part. For doing so, the foldable arm may comprise a connection portion at opposite ends.

In one example of the device and method, the foldable arm comprises one central rotational joint connecting different arm segments to one another, so that these may be moved away or towards one another, thereby unfolding or folding the arm. The rotation axis of said rotational joint may extend along at least one of the vertical spatial axis, the linear guide and/or the path defined thereby. This helps to provide a compact structure.

According to a further embodiment, the foldable arm comprises at least two rotational joints (and preferably at least three rotational joints) which are spaced apart from another (e.g. horizontally spaced apart from one another). The rotational joints may be arranged at the same height level and/or be spaced apart from one another within a horizontal spatial plane. The rotational joints may be connected to one another by means of arm segments of the foldable arm. One of the rotational joints may be the above-discussed central rotational joint. At least one other rotational joint may be provided at an end of one the arm segments, said end facing away from the central rotational joint. Also, said end and/or the rotational joint provided thereat may be used for connecting the foldable arm to a further member, such as the linear guide or power transfer part.

In one example, the foldable arm comprises the above-discussed central rotational joint connecting two arm segments of the foldable arm, wherein at each end of the arm segments facing away from the central rotational joint, a further rotational joint is provided. Specifically, one of said rotational joints at an end of the arm segments may be used for coupling (e.g. directly connecting) the foldable arm to the linear guide and the other for coupling (e.g. directly connecting) the foldable arm to the power transfer part.

Each rotational joint may define at least one rotational axis. In particular the above discussed central rotational joint and/or rotational joint for coupling to the linear guide may define only one rotational axis. A rotational joint for coupling to the power transfer part, on the other hand, may define at least two rotational axes which preferably extend at an angle to one another (e.g. orthogonally to one another). This way, more degrees of freedom are provided in order to adjust an orientation of the power transfer part relative to the vehicle.

In case a plurality of rotational joints is provided, at least one rotational axis of each rotational joint may extend in parallel a rotational axis of the further joints and, for example, extend in parallel to the vertical spatial axis, the linear guide and/or the linear path defined thereby. Specifically, the at least one rotational axis of each rotational joint may extend at an angle to the horizontal spatial plane.

The foldable arm (and in particular its one or more rotational joints) along with the specific orientations of the rotational axes of its joints provides a compact structure for reliably moving the power transfer part in a desired manner. Specifically, the foldable arm may provide a separate kinematic member for moving the power transfer part e.g. along a horizontal spatial axis. This way, the vertical movement and horizontal movement of the power transfer part may be achieved by individual kinematic members of the kinematic unit in form of the linear guide (vertical movement) and foldable arm (horizontal movement). Accordingly, these kinematic members may each be optimised with regard to their specific movements and forces associated therewith, thereby e.g. allowing for a reduction of complexity and costs while increasing the reliability. Also, since dedicated kinematic members may be provided for achieving desired movements, the operability of the overall device can be improved (e.g. no plurality of separate kinematic members need to be coordinated in order to achieve a vertical or horizontal movement). Moreover, the rotational joints of the rotatable arm allow for easily adjusting the power transfer part to different orientations of the vehicle (e.g. different berthing angles)

As previously discussed, the power transfer device may comprise a holding structure (e.g. in form at least a portion of at least one column, at least one pillar, at least one post or at least one bollard) at which the kinematic unit is arranged and/or for coupling the kinematic unit to the surroundings. The holding structure may generally be elongated and/or extend along a vertical spatial axis. The holding structure may generally serve to connect the kinematic unit to the surroundings (e.g. a sea or lake floor or to a quay). The linear guide may be attached to said holding structure or be formed by a section of the holding structure, such as an upper portion of a pillar, post or bollard.

According to a further example of the device and method, at least one outer face of the power transfer part comprises at least one region with a protective layer, said layer e.g. comprising at least one of a resin, plastic or rubber material (e.g. a vulcanized rubber). The outer face may be provided in form of a front face of front surface which faces a vehicle to which the power is to be transferred to. In one example, all outer faces (preferably including any edge portions) may be provided with a respective protective layer. In this context, however, recesses or through holes may be provided in said protective layer e.g. for connecting the kinematic unit or cables to the power transfer part.

In a further aspect of the device and method, a floatable member is provided that is configured to (e.g. designed, sized and/or positioned to) float on a body of water (e.g. in which the inductive power transfer device and/or the vehicle to be inductively charged is placed), wherein said floatable member is coupled to the displaceable member. The floatable member may e.g. be ring-shaped and surround a holding structure in form of a pillar, column or post. The floatable member may be formed of any floatable material. The floatable member may be substantially rigidly (i.e. non-deformably) coupled to the displaceable member, e.g. by stiff mechanical elements such as rods or plates. Generally, a vertical height adjustment of the floatable member in response to changing water levels may be directly translatable into a corresponding height adjustment of the displaceable member and, preferably, of the power transfer part. This way, a simple and reliable structure is provided for adjusting e.g. to changing tidal water levels.

Moreover, an actuator for setting and/or varying the position of the power transfer part along the linear guide may be provided. Said actuator may be electrically, hydraulically or pneumatically powered and e.g. comprise at least one cylinder. Generally, the actuator may have an adjustable length. The actuator may be provided at or adjacent to the linear guide and/or act on the displaceable member. A longitudinal axis of the actuator may extend along and/or in parallel to the linear guide and/or the path defined thereby.

In this context, the displaceable member may comprise at least two (preferably sleeve- or ring-shaped) sub-members and the actuator may be configured to set and/or vary a distance between said sub-members. One of said sub-members may be coupled to the floatable member. The other may be coupled to e.g. a foldable arm and/or the power transfer part. The actuator may be placed between and/or connected to both sub-members. The actuator may have an adjustable length, thereby moving the sub-members apart from or close to one another (and moving the power transfer part accordingly). This way, a compact structure for varying the height of the power transfer part is provided with preferably one single actuator.

The invention further relates to a system for an inductive power transfer to a water-bound vehicle, comprising an inductive power transfer device according to any of the previous claims wherein said power transfer device is fixed to the surroundings. The surroundings may be formed by a mooring area (e.g. a jetty, a shore or bank area, a quay, a landing stage), a wall (e.g. quay sidewall or quay surface), a floor (e.g. quay floor or natural (e.g. sea) floor) or a holding structure provided in the surroundings (such as a bollard, post, pillar or column).

Moreover, the invention relates to a method for operating an inductive power transfer device, the device being configured for an inductive power transfer to a water-bound vehicle, wherein the inductive power transfer device comprises:
- a power transfer part, comprising a primary conductor arrangement; and
- a kinematic unit for enabling a movement of the power transfer part;

wherein the kinematic unit comprises a linear guide and wherein the method comprises the step of moving the power transfer part along a (e.g. linear) path defined by the linear guide, thereby altering a position of the power transfer part along a vertical spatial axis.

The method may comprise any further step, any further development or any further feature in order to provide any of the previously or subsequently discussed interactions, operating states and functions. Specifically, any of the previous or subsequent explanations and developments regarding the device-features may also apply to the corresponding method-features. In general, the method may be realised and/or carried out with a device according to any of the previous or subsequent aspects.

For example, the method may further comprise a step of altering a position of the power transfer part along a horizontal spatial axis, e.g. by folding or unfolding a foldable arm of the kinematic unit. Also, the method may comprise a step of adjusting an orientation of the power transfer part, e.g. by means of a rotational joint provided within the kinematic unit. This orientation may be adjusted about at least two rotational axes which, preferably, extend at an angle to one another (e.g. orthogonally to one another)

Figure 2A:
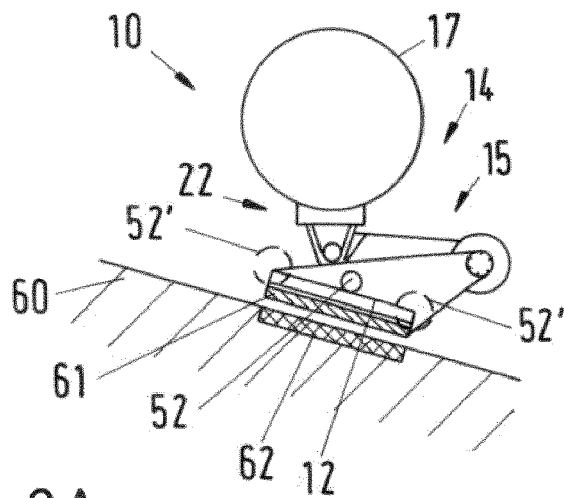
Figure 2B:
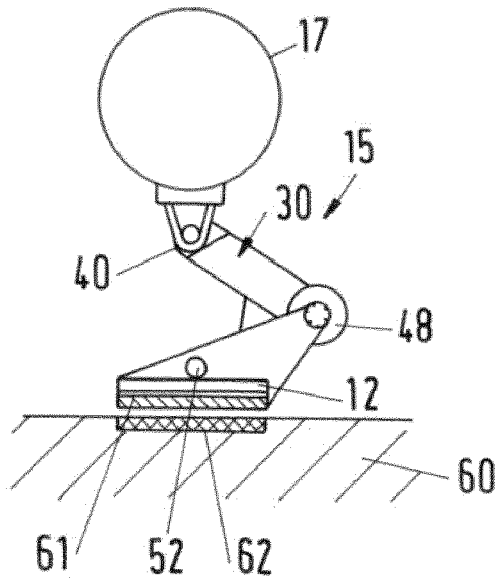
Figure 2C:
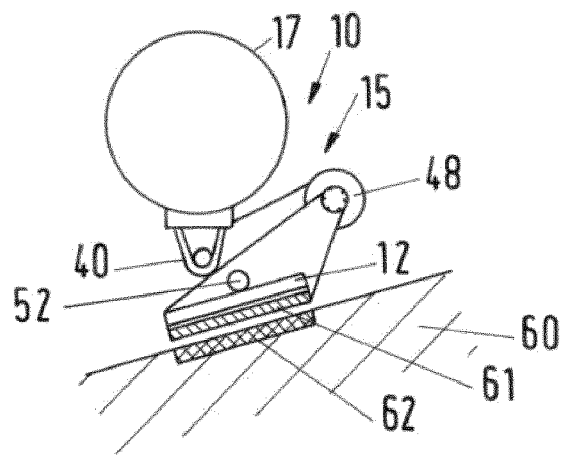
Figure 3:
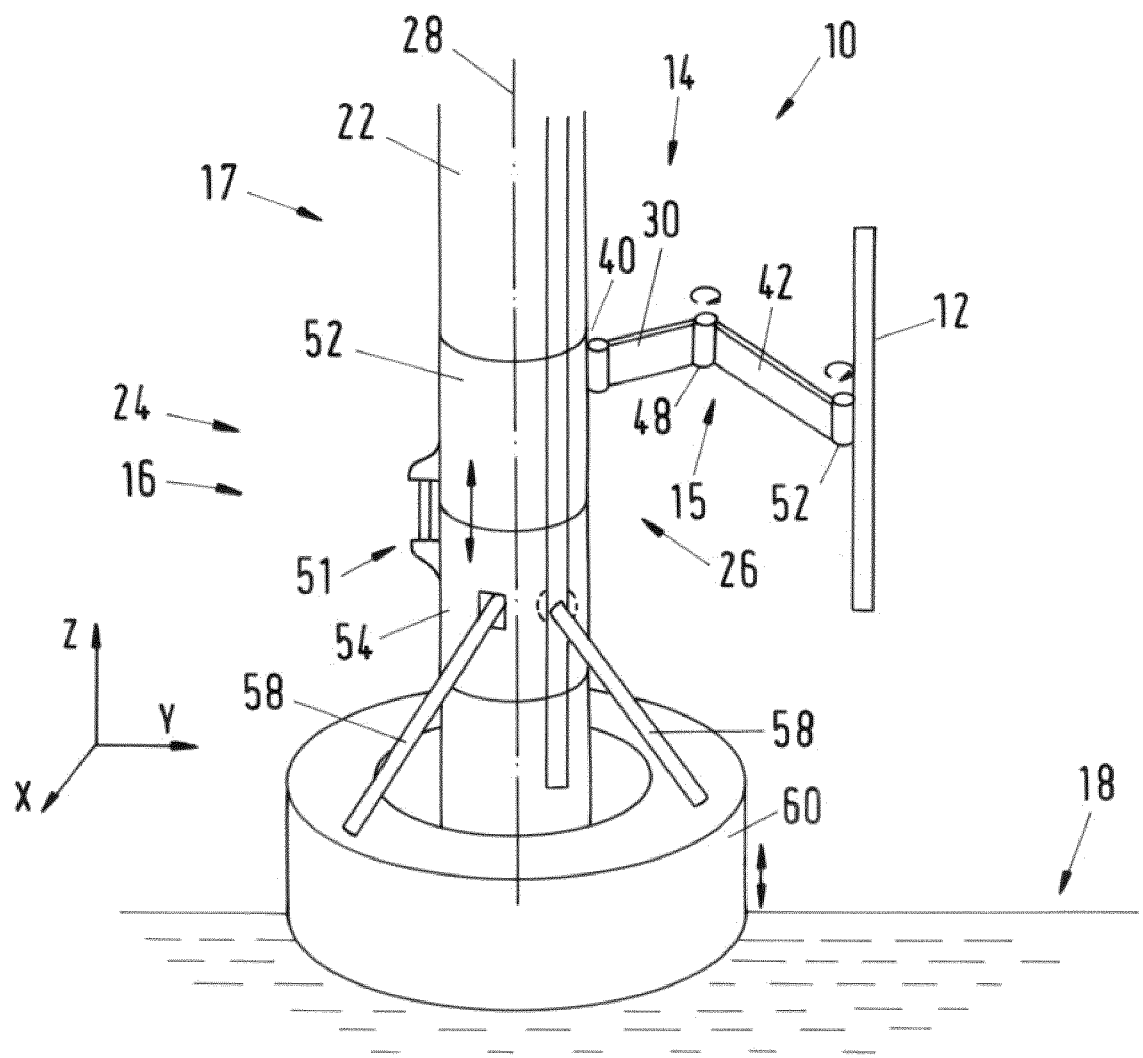

In the following, an embodiment of the invention will be described with reference to the attached schematic figures. Features which correspond to one another with regard to their type and/or function may be assigned the same reference signs throughout the figures. In the figures:

FIG. 1 shows a perspective view of a power transfer device according to an embodiment of the invention, said power transfer device being configured to carry out a method according to the invention;

FIGS. 2A-C show top views of the device according to FIG. 1 for transferring power to a vehicle at different berthing angles; and FIG. 3 shows an alternative embodiment of a power transfer device according to the invention.

In FIG. 1, a power transfer device 10 according to an embodiment of the invention is shown. The power transfer device 10 comprises a power transfer part 12 whose position and/or orientation in space is adjustable by means of a kinematic unit 14. Moreover, the power transfer device 10 comprises a holding structure 16 to which the kinematic unit 14 is attached. In FIG. 1, a Cartesian coordinate system is shown in which the Z-axis corresponds to a vertical spatial axis (i.e. an axis of the gravitational force, but oriented oppositely thereto). The Y- and the X-axis extend within the horizontal spatial plane and both represent a horizontal axis.

Moreover, in FIG. 1 a water level 18 is shown. The power transfer device 10 is arranged above the water level 18 apart from the holding structure 16 which is partially submerged in the water. Thus, the power transfer part 12 may be arranged so as to face a portion of a (not depicted) vehicle such as a ship or boat to which power is to be transferred to, said portion comprising a pick-up-arrangement or receiver for receiving the transferred electrical energy. Said portion will be equally positioned above the water level 18.

As evident from FIG. 1, the holding structure 16 is provided in form of a hollow column 17. The column 17 is anchored at the floor of the body of water, such as the sea floor. Thus, FIG. 1 also shows a system 1 according to the invention in which a power transfer device 10 is fixed to the surroundings (i.e. to the sea floor).

In a respective anchoring portion (not shown) of the column 17, electrical components and/or electrical connecting sections may be provided in order to attach power transfer cables thereto. Cables 20 for transferring electrical energy to the power transfer part 12 may generally be guided at least through the lower part of the column 17 as indicated in FIG. 1 by dotted lines. Note that the cables 20 are guided through a hollow section of the column 17, thus being enclosed and shielded from the environment. Also, the cables 20 connect to the power transfer part 12 at a location remote from a front surface thereof facing the vehicle (e.g. at a backside of the power transfer part 12).

The depicted power transfer device 10 may be used in offshore applications, such as close to offshore wind turbines. Alternatively, the holding structure 16 could be mounted to e.g. a quay wall in for example a harbour (e.g. to a horizontal top or vertical side surface thereof). In this case, the holding structure 16 could be completely positioned above the water level 18.

The column 17, which generally extends along the vertical spatial axis Z, has an upper portion 22 which acts as a guiding member of a linear guide 24. The linear guide 24 further comprises two displaceable members in form of sleeves 26 which are spaced apart from one another along the column 17 and are configured to slide along the upper portion 22 of the column 17. Accordingly, a path 28 (i.e. a movement or displacement path) of the linear guide 24 is defined along which these sleeves 26 may be displaced, said path 28 being linear as well. As can be gathered from FIG. 1, the linear path 28 extends along the vertical spatial axis Z (see respective leftmost arrows in FIG. 1). Accordingly, the linear guide 24 is oriented orthogonally (i.e. at an angle of 90°) to the horizontal spatial plane defined by the X- and Y-axis.

A distance between the sleeves 26 is constant. Accordingly, both sleeves 26 are generally displaceable along the linear guide 24 but only in a joint manner (i.e. by keeping their distance constant and not moving relative to one another). By way of a respective displacement, a vertical height of the panel 12 can be adjusted. Note that the linear guide 24 could also be considerably longer as presently depicted, thereby allowing for significant height adjustments. It is, however, also contemplated to, additionally or alternatively, include a degree of vertical freedom of the panel 12 independent of the sleeves 26 (e.g. within or at member 48). Said degree of freedom may equally be realized by or as a linear guide.

The linear guide 24 is part of the kinematic unit 14. The kinematic unit 14 further includes a foldable arm 15 with a first arm segment 30, which comprises two sub-segments 32 extending in parallel to one another as well as horizontally. The sub-segments 32 are each attached to one of the sleeves 26 by means of a first pair of rotational joints 40. Note that these rotational joints 40 are not horizontally spaced apart from one another. The rotational joints 40 each define a vertical axis of rotation 42, so that the first arm segment 30 may be turned about said vertical axis 42 (see respective curved arrows in FIG. 1).

Attached to the first arm segment 30 is a second arm segment 42. Said second arm segment 42 comprises a vertical pole 44 as well as two plate members 46 attached to said pole 44 and extending towards the power transfer part 12. The second arm segment 42 is attached at both ends of the pole 44 to a pair of rotational joints 48, thereby being coupled to the sub-segments 32 of the first arm segment 30. Accordingly, a second rotational axis 50 is defined which again extends along the vertical spatial axis Z. Note that the rotational joints 48 are not horizontally spaced apart from one another, but from the further pair of rotational joints 40 connecting the sleeves 26 and sub-segments 32. The rotational joints 48 act as central rotational joints of the foldable arm 15.

The plate members 46 of the second arm segment 42 are coupled to the power transfer member 12 by means of a further rotational joint 52, which is obstructed in FIG. 1 but indicated in the following FIGS. 2A-2C. This rotational joint 52 generally connects to a backside of the power transfer part 12 at a position close to or coinciding with a geometric centre and/or centre of gravity of the power transfer part 12. Moreover, said rotational joint 52 defines two rotational axes, namely a vertical rotational axis as well as a rotational axis extending along the Y-axis in FIG. 1. Accordingly, the power transfer part 12 may be tilted about these two rotational axes as indicated by respective pairs of arrows along the edges of the power transfer part 12 in FIG. 1. Specifically, the upper pair of arrows indicates the possibility to tilt the power transfer part forwards and backwards by means of the rotational axis extending along the Y-axis. The lower pair of arrows indicates the possibility to tilt the power transfer part 12 about the vertical spatial axis Z by means of the further rotational axis of the rotational joint 52.

It should be noted that the members (i.e. different arm segments 30, 42 and rotational joints 40, 48, 52) of the foldable arm 15 are partially hollow as well, so that the cables 20 can be guided therethrough in order to connect them to the power transfer part 12 (see respective dotted lines in FIG. 1 which start within the column 17).

From FIG. 1, it can further be gathered that the power transfer part 12 is configured as a plate type member or, differently put, a panel. Moreover, the power transfer part 12 extends at an angle to the horizontal spatial plane and, in the depicted state, extends substantially orthogonally thereto. A height H of the power transfer part 12 further extends along the vertical spatial axis Z. A thickness T may be in the range of several centimetres (e.g. between 5 cm and 30 cm). Generally, the power transfer part 12 is designed to be sufficiently rigid in order to absorb shocks and/or pressures applied thereto by the vehicle. In addition, at least a front surface of the power transfer part 12 facing the viewer in FIG. 1 may be covered by a protective layer made of e.g. resin or rubber (see respective layer 61 in FIGS. 2A-C).

For illustrative purposes, the protective layer is not depicted in FIG. 1. Instead, some of the interior components are depicted which are not actually exposed to the environment but housed within and covered by the power transfer part 12. This relates, first of all, to a primary conductor arrangement 54. The primary conductor arrangement of 54 comprises three individual phase lines, namely a first phase line L1, a second phase line L2 and a third phase line L3. These each extend in the horizontal direction (i.e. along the Y-axis) in a meandering manner and are connected to one another at a star point 56. Accordingly, each phase line L1, L2, L3 comprises horizontal as well as vertical sections. Moreover, each phase line L1, L2, L3 is connected to and provided with an individual phase current, wherein a distance between the phase line L1, L2, L3 and in particular between vertical sections thereof is chosen so that a phase difference of 120° between the individual phase currents is provided. Further details on such a design of a primary conductor arrangement 54 can be found in GB 2512864 a, in particular in connection with FIG. 2.

It is evident from FIG. 1, that the primary conductor arrangement 54 and in particular each phase line L1, L2, L3 which forms meandering sections thereof, extends within the plane of the panel-type power transfer part 12. Accordingly, the primary conductor arrangement 54 generally extends and/or is generally formed in a non-horizontal spatial plane and extends substantially vertically in the depicted state. Moreover, the main direction of a magnetic flux produced by the primary conductor arrangement 54 in the area of said primary conductor arrangement 54 extends substantially orthogonally to the plane of the primary conductor arrangement 54 and the power transfer part 12, i.e. substantially horizontally (for example ca. at an 45°-angle between the depicted X- and Y-axis and towards the viewer). In addition, a normal to the plane defined by the phase lines L1, L2, L3 is a horizontal axis, which again may extend ca. at an 45°-angle between the depicted X- and Y-axis. Accordingly, the conductors L1, L2, L3 of the conductor arrangement 54 generally extend in and describe a defined course (i.e. a meandering course) in a non-horizontal spatial plane. That is, a longitudinal axis of each conductor L1, L2, L3 which extends along and defines a length-dimension of the conductors L1, L2, L3 runs in a non-horizontal spatial plane. Overall, the conductor arrangement 54 is thus arranged and extends in a non-horizontal plane.

As a further (interior) component of the power transfer part 12, an object detection means 58 in the form of an antenna is shown. The object detection means 58 comprises a single detection winding 59 and generally acts the as a passive inductive sensor for detecting the presence of an object, such as a (metallic) part of the vehicle to which power is to be transferred to.

The inductive power transfer device 10 allows for a direct, easy to operate and reliable setting of a height of the power transfer part 12 by adjusting its position along the vertical spatial axis Z. This is achieved by displacing the sleeves 26 along the guide member 24 of the linear guide 24. It is to be noted that the linear guide 24 represents the only means of the inductive power transfer device 10 by which the vertical position of the power transfer part 12 can be adjusted. Again, this helps to simplify the operability of the device 10 and renders the overall system (and in particular the kinematic unit 14) less complex. Moreover, due to the upright (i.e. vertical) orientation of the linear guide 24, which is also generally constant (i.e. fixed), the dimensions of the power transfer device 10 and thus the required installation space (i.e. footprint) can be kept small.

In addition, the fixed orientation of the linear guide 24 means that forces which are exerted onto the power transfer part 12 (e.g. shocks or pressures) will be transferred by the kinematic unit 14 to the holding structure 16 in a predictable manner, leading to similar distributions of forces regardless of a vertical position of the power transfer part 12. More precisely, such forces will lead to bending stresses within the holding structure 16. The holding structure 16 can thus be optimised to withstand these bending stresses, without having to be optimised for a large possible range of other force distributions and stresses associated therewith. This increases the reliability and helps to save space.

The foldable arm 15, on the other hand, allows for adjusting a horizontal position of the power transfer part 12 as well as an orientation with respect to the horizontal spatial plane. Moreover, in particular by way of the rotational joint 52 which is connected to the power transfer part 12, the latter may be precisely adjusted (e.g. tilted) relative to a pick-up-arrangement of the vehicle (cf. following discussion of FIGS. 2A-C). This is particularly relevant in case the vehicle might assume different berthing angles with respect to the power transfer device 10.

Again, each of the described movements can be achieved by means of a dedicated kinematic members or joints of the kinematic unit 14, thus further reducing complexity and improving operability. Moreover, since the foldable arm 15 can be folded into a compact state (see following FIGS. 2A-C), the dimensions of the power transfer device 10 and thus the required installation space (i.e. footprint) can be further reduced. This relates in particular to a state in which the power transfer device 10 is not in use (i.e. does not transfer power to a vehicle). In this state, the foldable arm 15 may be folded together and assume a compact space-efficient state.

Finally, since only one single column 17 is required as a holding structure 16, the costs can be reduced e.g. compared to a large retractable arm with additional cylinders as used in the prior art. This would also apply if a plurality of for example two columns 17 were used.

In FIGS. 2A-C a top view onto the power transfer device 10 is shown. Note that these figures are highly schematic and may deviate substantially from the details shown in FIG. 1. Instead, they merely serve to illustrate the operation and movements of the foldable arm 15.

From FIG. 2A, a position of the column 17 can be gathered to which the kinematic unit 14 is connected by way of the linear guide 24. Moreover, especially in FIG. 2B, a position of the linear joints 40 as well as the central linear joint 48 can be gathered which are connected to one another by means of the first arm segment 30. Furthermore, a position of the rotational joint 52 which couples the power transfer part 12 to the rotatable arm 15 is indicated. Note that instead of one rotational joint 52, also two rotational joints 52' indicated in FIG. 2 could be used which are e.g. coupled to opposite edge portions of the power transfer part 12. Still further, in these figures the protective layer 61 at the front surface of the power transfer part 12 is indicated.

Moreover, FIGS. 2A-C indicate the position of a vehicle 60 comprising a pick-up-arrangement 62, to which power is to be transferred to by means of the primary conductor arrangement 54.

In FIG. 2A, the foldable arm 15 assumes a substantially fully folded state. A horizontal distance between the power transfer part 12 and the linear guide 22 is thus minimised.

In FIG. 2B, the vehicle 60 is positioned at a greater distance to the column 17. Accordingly, the foldable arm 15 is at least partially unfolded so as to keep a distance between the power transfer part 12 and the pick-up-arrangement 62 within a preferred limit.

In FIG. 2C, the foldable arm 15 again assumes a substantially fully folded state. However, compared to the state in FIG. 2A, the vehicle 60 is a different berthing angle with respect to the power transfer device 10. Yet, due to the rotational degrees of freedom provided by the rotatable arm 15 and in a particular by its rotational joints 40, 48 and 52, the power transfer part 12 can again be arranged so as to face the pick-up-arrangement 62 and extends substantially in parallel thereto.

In sum, the rotatable arm 15 thus allows for a preferred arrangement of the power transfer part 12 with respect to a pick-up-arrangement 62 of the vehicle 60. Specifically, the rotatable arm 15 allows for orienting the power transfer part 12 in parallel to and within a preferred minimum distance to the pick-up-arrangement 62, even when the vehicle 60 assumes different berthing angles with respect to the power transfer device 10 and/or varying distances thereto. Again, this is achieved with an overall compact, easy to operate, and reliable structure of the power transfer device 10.

In the previous figures, the power transfer device 10 is designed as a passive system which does not comprise any actuatable, controllable or driven actuators for providing any of the discussed movements of the kinematic unit 14. Instead, the vehicle 60 may e.g. be connected to the power transfer part 12 or a different part of the kinematic unit 14 by way of magnets, vacuum cups, ropes or the like. The power transfer part 12 may then passively follow the movements of the vehicle 60 e.g. in response to tidal water level changes or a changing berthing angle.

For doing so, any of the previously discussed joints 40, 48, 52 or displaceable members 26 may be provided with a defined resistance to positional or orientational changes and/or generally configured to maintain a currently set position or orientation. For example, the displaceable members 26 may be arranged at the guiding member 22 with a defined clamping force. Additionally, the rotational joints 40, 48, 52 may comprise springs or be internally clamped with a defined force, so as to provide the desired resistance. Nonetheless, as soon as the forces exerted onto the displaceable members 26 or rotational joints 40, 48, 52 exceed a threshold value, the previously discussed movements may take place.

It would, however, be generally possible to include rotational actuators in at least some or each of the rotational joints 40, 48, 52 or to displace the displaceable members 26 by way of actuators.

In FIG. 3, an alternative embodiment is shown in which the power transfer device 10 is not fully passive but comprises at least one actuator 51. Apart from the differences discussed below, this embodiment is configured similarly to the previous embodiment, if not mentioned or evident otherwise.

Again, a power transfer part 12 can be seen which is configured as a plate-type member. The power transfer part 12 is connected to one two-part displaceable member 26 by way of a foldable arm 15 of a kinematic unit 14. The foldable arm 15 again comprises a plurality of horizontally spaced apart rotational joints 40, 48, 52 which are connected to each other by way of arm segments 30, 42. Note that the rotational joints 40, 48, 52 and arm segments 30, 42 deviate from the design depicted in FIG. 1 but provide identical functions. In addition, any or each of the rotational joints 40, 48, 52 may include a rotational actuator for rotating the units connected thereto. Also, in the shown example, each of the rotational joints 40, 48, 52 defines a vertical rotational axis extending along the Z-axis, whereas the rotational joint 52 connected to the power transfer part 12 may optionally define an additional horizontally extending rotational axis.

The displaceable member 26 comprises two ring- and sleeve-shaped sub-members 52, 54. These are again displaceable along an upper section of a column 17 forming a guiding member 22, a linear guide thus being defined by the displaceable member 26 and guiding member 22. Similar to the previous example, the lower section of said column 17, which is submerged in the water 18, acts as a holding structure 16. The foldable arm 15 is connected to the upper sub-member 52. The sub-members 52, 54 are connected to one another by way of the actuator 51 which is generally elongatable. For example, the actuator 51 may be a hydraulically, pneumatically or electrically powered and thus elongatable cylinder which may draw the sub-members 52, 54 together or push them apart (see perspective double arrow near the actuator 51 in FIG. 3). This way, a distance between the sub-members 52, 54 may be varied and set (i.e., maintained) by means of the actuator 51.

The actuator 51 as well as a movement path 28 of the sub-members 52, 54 extend along vertical axis as well as a longitudinal axis of the column 17. Accordingly, the guiding member 22 again defines a vertically extending linear movement path 28 along which the power transfer part 12 is movable, the latter being coupled to the upper sub-member 52 by way of the foldable arm 15.

The lower sub-member 54 is connected by means of rigid rods or supports 58 to a floatable ring-shaped member 60 which receives the column 17 in its centre (i.e., surrounds the column 17). The floatable member 60 floats on the water 18, thereby following its tidal water level changes (see respective lower double arrow in FIG. 3). If maintaining the actuator 51 in a currently set state (i.e. at a currently set length), the movements of the floatable member 60 will be transferred to both sub-members 52, 54 and thus to the power transfer part 12. Thus, a height of the power transfer part 12 can adjusted according to changing water levels, thereby maintaining a constant relative position (at least along the vertical axis) to a vehicle 60 to be charged (not depicted in FIG. 3). On the other hand, in case the power transfer part 12 is to be positioned relative to a specific vehicle 60, the actuator 51 can be activated to adjust the height of the power transfer part 12 in a desired manner.

Note that the usage of sleeve-type displaceable members 26 in the above examples is not mandatory. Alternatively, the kinematic unit may e.g. comprise a linear guide 24 formed by a guide rail which is fastened to a holding structure 16 formed by a similar column 17 discussed above. Similar to FIG. 3, two displaceable members 26 could be attached to said guide rail in such a manner, that a distance therebetween can be set by means of an actuator 51 (e.g. by connecting said displaceable members 26 to separate members which are individually received in and/or movable along said guide rail).

The invention claimed is:

1. An inductive power transfer device for an inductive power transfer to a water-bound vehicle, the inductive power transfer device comprising:
    a power transfer part, comprising a primary conductor arrangement; and
    a kinematic unit for enabling a movement of the power transfer part;
    characterized in that the kinematic unit comprises a linear guide which is oriented so that, when the power transfer part is displaced along a path defined by the linear guide, a position of the power transfer part along a vertical spatial axis (Z) is altered,
    wherein the kinematic unit further comprises a foldable arm that allows for a movement of the power transfer part along at least one horizontal spatial axis (X, Y),
    wherein the foldable arm comprises at least two rotational joints which are spaced apart from another;
    wherein the linear guide comprises an elongated guiding member and at least one displaceable member which is displaceable along said guiding member; and
    wherein the inductive power transfer device further comprises a floatable member that is configured to float on a body of water, wherein said floating member is coupled to the displaceable member.

2. The inductive power transfer device according to claim 1, wherein the primary conductor arrangement extends in a non-horizontal spatial plane.

3. The inductive power transfer device according to claim 1, wherein the orientation of the linear guide at least with respect to the horizontal spatial plane is fixable or fixed.

4. The inductive power transfer device according to claim 1, wherein said linear guide extends at an angle of between 70° and 110° with respect to a horizontal spatial plane.

5. The inductive power transfer device according to claim 1, wherein at least one rotational axis of each rotational joint extends substantially in parallel to the linear guide and/or at an angle to the horizontal spatial plane.

6. The inductive power transfer device according to claim 1, further comprising a holding structure for coupling the kinematic unit to the surroundings.

7. The inductive power transfer device according to claim 1, wherein at least one outer face of the power transfer part comprises at least one region with a protective layer.

8. The inductive power transfer device according to claim 1, further comprising an actuator for setting the position of the power transfer part along the linear guide.

9. The inductive power transfer device according to claim 8, wherein the displaceable member comprises at least two sub-members and the actuator is configured to set a distance between said sub-members.

10. A system for an inductive power transfer to a water-bound vehicle, comprising an inductive power transfer device according to claim 1 wherein said power transfer device is fixed to the surroundings.

11. A method for operating an inductive power transfer device, the device being configured for an inductive power transfer to a water-bound vehicle, wherein the inductive power transfer device comprises:
    a power transfer part, comprising a primary conductor arrangement; and
    a kinematic unit for enabling a movement of the power transfer part;
    wherein the kinematic unit comprises a linear guide; and
    wherein the kinematic unit further comprises a foldable arm that allows for a movement of the power transfer part along at least one horizontal spatial axis (X, Y),
    wherein the foldable arm comprises at least two rotational joints which are spaced apart from another;
    wherein the linear guide comprises an elongated guiding member and at least one displaceable member which is displaceable along said guiding member, and
    wherein the inductive power transfer device further comprises a floatable member that is configured to float on a body of water, wherein said floating member is coupled to the displaceable member,
    wherein the method comprises the step of:
        moving the power transfer part along a path defined by the linear guide, thereby altering a position of the power transfer part along a vertical spatial axis (Z);

and is further characterized by the step of:
altering a position of the power transfer part along the horizontal spatial axis (X, Y) by folding or unfolding the foldable arm of the kinematic unit.

* * * * *